United States Patent [19]

Yasuda

[11] 3,957,272
[45] May 18, 1976

[54] CARTRIDGE SHELL FOR PHONOGRAPH PICKUP

[75] Inventor: Shiro Yasuda, Tokyo, Japan

[73] Assignee: Sony Corporation, Tokyo, Japan

[22] Filed: Apr. 9, 1975

[21] Appl. No.: 566,226

[30] Foreign Application Priority Data

Apr. 18, 1974 Japan............................ 49-43964[U]

[52] U.S. Cl............................................... 274/23 R
[51] Int. Cl.$^2$........................................... G11B 3/10
[58] Field of Search....................... 274/23 R; 264/29

[56] References Cited
UNITED STATES PATENTS

| | | | |
|---|---|---|---|
| 1,321,178 | 11/1919 | Wolff................................ | 274/23 R |
| 2,509,356 | 5/1950 | Kilgour.............................. | 274/37 |
| 3,556,537 | 1/1971 | Stacy................................. | 274/23 R |
| 3,818,082 | 6/1974 | Burns et al....................... | 264/29 |

Primary Examiner—Richard E. Aegerter
Assistant Examiner—Charles E. Phillips
Attorney, Agent, or Firm—Hill, Gross, Simpson, Van Santen, Steadman, Chiara & Simpson

[57] ABSTRACT

A cartridge shell for supporting a phonograph cartridge on the end of a tone arm is provided which is formed of a sheet of carbonaceous fibers bonded together by a synthetic resin into an L-shaped member having a horizontal leg portion and a vertical leg portion. A metal plate also of L-shape covers the upper surface of said horizontal leg of said carbonaceous fiber sheet and also covers the outer surface of said vertical leg of said carbonaceous fiber sheet. The metal plate intimately engages said fiber sheet and is firmly attached thereto. The cartridge shell is made light in weight with high internal loss and is also quite rigid. This is obtained by the use of the carbonaceous fibers bonded together by a synthetic resin and secured to a metal cover plate by a suitable adhesive or by a heat-press.

7 Claims, 7 Drawing Figures

U.S. Patent   May 18, 1976   Sheet 2 of 2   3,957,272
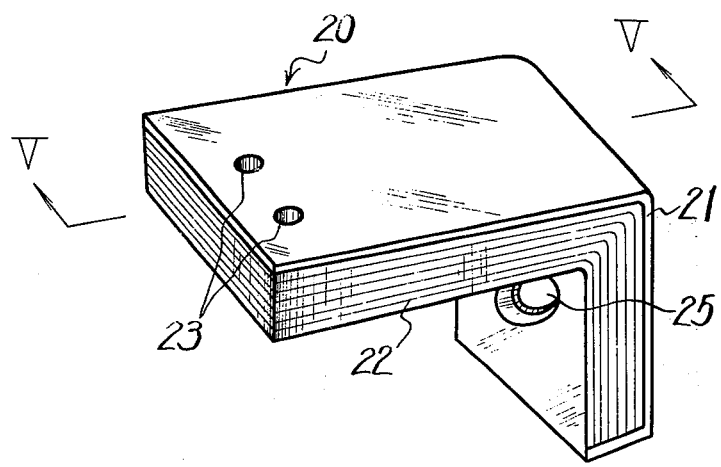
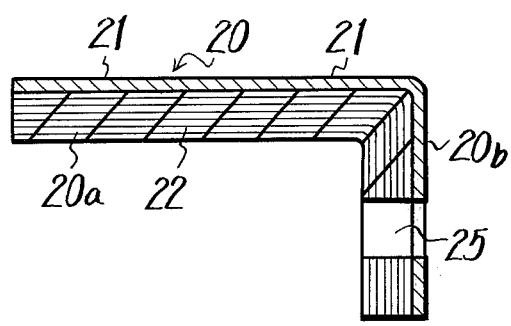
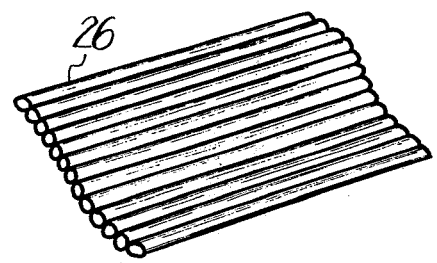
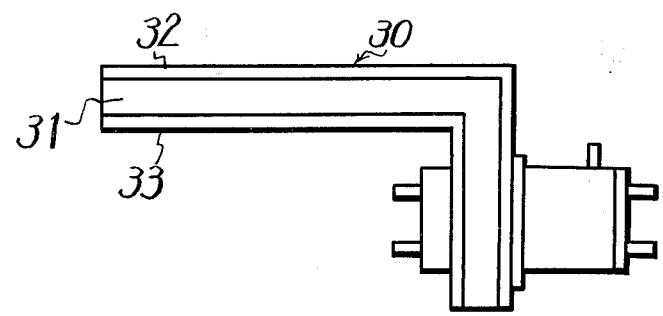

CARTRIDGE SHELL FOR PHONOGRAPH PICKUP

BACKGROUND OF THE INVENTION

1. Field of the Invention

This invention relates to a cartridge shell for mounting a cartridge used in a phonograph record player and specifically involves the use of a material of construction which provides the shell with improved stiffness and frequency response.

2. Description of the Prior Art

The typical phonograph pickup system employs a tone arm which is pivotally supported on a fulcrum, and carries a cartridge from which there is a depending cantilever which carries a stylus. Generally, the shell in which the phonograph cartridge is mounted is composed of steel or aluminum, but these materials have the disadvantage that their rigidity is not relatively high, and they do not have suitable vibration damping properties.

In order to solve such problems, it has been proposed that a shell be formed by a composite member made of carbonaceous fibers bonded together with a synthetic resin such as phenolic resin, epoxy resin, or the like, as described in U.S. application, Ser. No. 489,073, now U.S. Pat. No. 3,923,309 assigned to the same assignee as the present invention.

In this earlier case, the shell is formed from a large number of fine carbon fibers each having a diameter of about 7 microns and being from 3 to 4 millimeters in length. With a sheet made in such a manner, the reproducing characteristics are improved in comparison with conventional shells. However, since many of the carbon fibers could not be mixtured with resin, for example, a maximum of about 30 percent (in this case, the resin being 70 percent), so that, the equivalent mass is not particularly decreased. Furthermore, the equivalent mass is decreased when a shell is formed by only carbon fibers as described and shown in FIGS. 8 and 9 of said application, Ser. No. 489,073. However, in this case, Ser. No. 489,073, an upper surface of the shell is not shaped well. In other words, there is a great deal of roughness on the upper surface.

SUMMARY OF THE INVENTION

The present invention is directed to a cartridge shell for a phonograph pickup which is composed of carbonaceous fibers bonded together by means of a synthetic resin, such as a thermosetting epoxy of phenolic resin. The term "carbonaceous fibers" is meant to include the high modulus fibers which are currently available and which may be carbon or graphite. The cartridge shell of the present invention has a resonant frequency such that it does not pick up noise components due to the presence of a warped or otherwise eccentric record. The cartridge shell of the present invention has a high degree of rigidity and a high internal loss so that the cartridge does not produce resonance phenomenon in the middle sound range within the frequency band of a reproduced signal. The cartridge shell of the present invention is also capable of being mass produced and is relatively inexpensive.

Further, a shell according to this invention is formed by a combination of carbon fibers with a metal, so that the above mentioned problems are solved. Namely, since a large number of carbon fibers are used, the equivalent mass is decreased much more, and since a metal is laminated on the carbon fibers, there is no roughness. Also, by a combination of carbon fibers with a metal, resonances are dispersed, so that a shell is not resonated with a specific vibration frequency.

BRIEF DESCRIPTION OF THE DRAWINGS

Other objects, features and advantages of the invention will be readily apparent from the following description of certain preferred embodiments thereof, taken in conjunction with the accompanying drawings, although variations and modifications may be effected without departing from the spirit and scope of the novel concepts of the disclosure, and in which:

FIG. 4 is a view in perspective of a cartridge shell according to the present invention;

FIG. 5 is a cross-sectional view taken substantially along the line V—V of FIG. 4;

FIG. 6 is an enlarged perspective view of the preimpregnated sheets of carbonaceous fibers used to form the shell shown in FIG. 4; and FIG. 7 is a side view showing a second embodiment.

DESCRIPTION OF THE PREFERRED EMBODIMENTS

Figure 1:
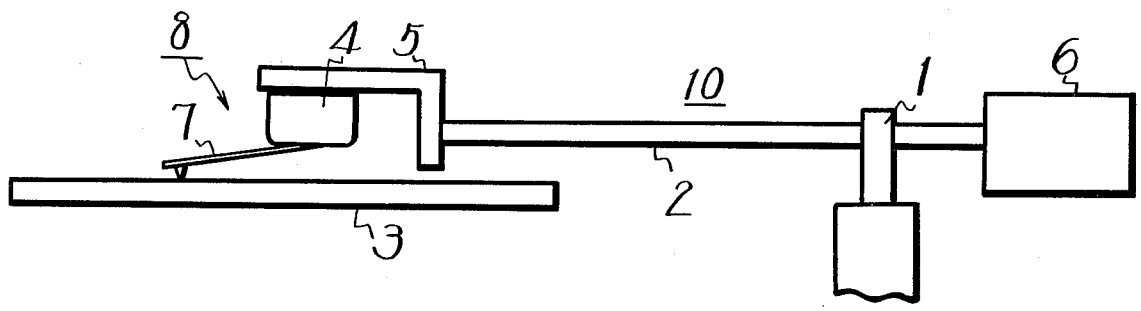
FIG. 1 is a schematic side elevational view showing a conventional phonograph pickup assembly.
Figure 2:
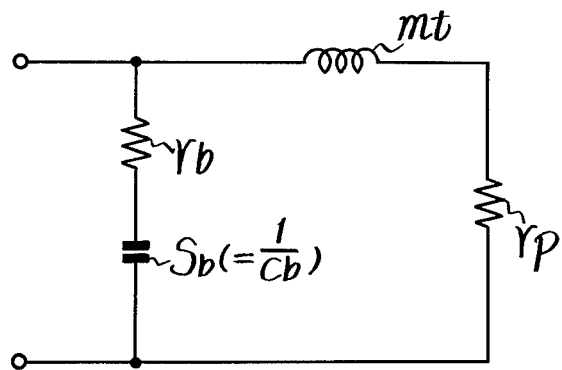
FIG. 2 is a circuit diagram of the equivalent circuit of a vibrating system used to pick up a low frequency sound.
Figure 3:
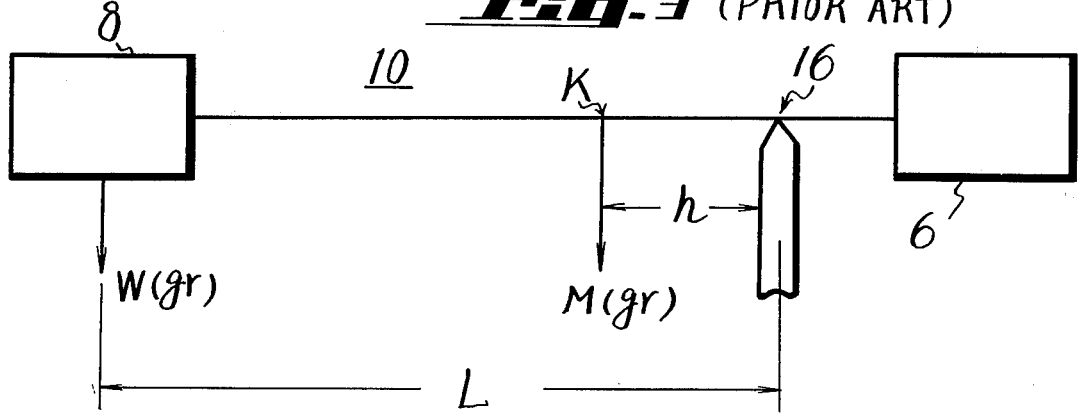
FIG. 3 is a schematic diagram illustrating the pickup shown in FIG. 1 as a physical pendulum.

The physical problems involved in phonograph tone arms will be described in conjunction with FIGS. 1 to 3, inclusive. In FIG. 1, reference numeral 10 indicates generally a pickup system of the type commonly used in modern day phonographs. A tone arm 2 is pivotally supported by means of a fulcrum 1. A cartridge 4 is secured to a cartridge shell 5 which is connected to the tone arm. At the opposite end of the tone arm 2 there is mounted a counterweight 6. A cantilever 7 is connected to the cartridge 4 and carries a stylus for engaging the grooves of a record member 3. The reference numeral 8 has been applied to the entire pickup head assembly including the cartridge 4, the shell 5 and the cantilever 7.

When a sound signal on the record disc 3 is picked up by the pickup assembly 10, the quality of reproduction is dependent to a significant degree upon the characteristics of the shell 5. The lower limit of the low frequency range will to a large extent be determined by the arm resonance frequency $f_L$. The equivalent circuit for a vibrating system for picking up low frequency sounds is shown in FIG. 2. In that Figure, reference character $m_t$ represents the equivalent mass of the tone arm 2 including the cartridge 4 and the head shell 5, and $r_p$ the equivalent resistance of the tone arm 2 at its fulcrum 1. Reference character $r_b$ denotes an equivalent resistance of the armature supporting portion and $S_b$ denotes an equivalent stiffness of the armature supporting portion. As apparent from FIG. 2, the low sound range reproduction limit frequency $f_L$ is expressed as follows:

$$f_L = \frac{1}{2\pi \sqrt{m_t \cdot C_b}} \quad (1)$$

where $C_b$ represents the compliance.

It will be noted that if the stiffness $S_b$, which represents the conformability of the cartridge 4 is made constant, the limit frequency $f_L$ is determined by the equivalent mass $m_t$ of the tone arm 2 including the shell 5 and the cartridge 4. The equivalent mass $m_t$ refers to the equivalent mass of the whole pickup system 10 viewed from the stylus tip of the cartridge 4. For convenience in explanation, it will be considered that the tone arm 2 is represented by the mass $M_h$ of the pickup head 8 and the mass $M_w$ of the counterweight 6, respectively, as shown in FIG. 3. The equivalent mass $M_t$ in the case of a light stylus tip is approximately expressed as follows:

$$m_t = M_h \left(1 + \frac{M_h}{M_w}\right) \tag{2}$$

Since the mass $M_w$ of the counterweight 6 is usually 2 to 5 times as much as the mass $M_h$ of the pickup head 8, the equivalent mass $M_t$ may be substantially represented by the mass $M_h$ of the pickup head 8. However, the pickup head 8 includes the shell 5 and a cartridge 4 mounted to the former as shown in FIG. 1. The mass of the cartridge 4 is normally about 8 grams and the mass of the shell is usually about 10 grams. Therefore, the equivalent mass $m_t$ will vary according to the variation of the mass of the shell 5 and hence the low limit frequency $f_L$ affecting the low frequency characteristics of the pickup system is greatly dependent upon the magnitude of the mass of the shell 5. The limit frequency $f_L$ is desirably selected to be in the neighborhood of 10 Hertz so that the cartridge 4 does not pick up noise components which are produced due to warping of eccentricity of the recording disc 3 and usually distributed in the frequency range of 1 to a few Hertz. If the shell 5 is formed of a material such as iron or aluminum and weighs about 10 grams and a cartridge 4 of high compliance is used, the limit frequency $f_L$ will be lowered as apparent from equation (1). The limit frequency may be as low as 3 to 5 Hertz, so that noise components can not be effectively eliminated.

The magnitude of the equivalent mass $m_t$ is also affected by the conformability of the pickup system. In the case where the pickup system is regarded as a physical pendulum shown in FIG. 3, the period $T$ in seconds of the tone arm 2 can be expressed as follows:

$$T = 2\pi \sqrt{\frac{I}{M \cdot g \cdot h}} \tag{3}$$

where $M$ in grams is the static mass of the whole pickup, $I$ in gram centimeter$^2$ is the moment of inertia about a fulcrum 16, $h$ is the center of distance between the center of gravity K and the fulcrum 16, and $g$ in centimeters per second squared is the acceleration due to gravity. If the stylus pressure is taken as W grams, and the distance between the stylus and the fulcrum 16 as L centimeters, and the radius of gyration as $k$ in centimeters, the distance $h$ and the moment of inertia $I$ can be expressed as follows:

$$h = \frac{WL}{M}$$

$$I = M(k^2 + h^2)$$

As a result, equation (3) can be written as follows:

$$T = 2\pi \sqrt{\frac{k^2 + \left(\frac{WL}{M}\right)^2}{g\left(\frac{WL}{M}\right)}} \tag{4}$$

If there are two pickup systems, and the stylus pressure $W$ and the distance $L$ between the stylus tip and the fulcrum are exactly the same for both systems but the total static mass of the pickup systems is different from each other and are represented by $M_1$ and $M_2$, the ratio of the periods $T_1$ and $T_2$ is expressed from equation (4) as follows:

$$\frac{T_1}{T_2} \cong \sqrt{\frac{k_1^2 + \left(\frac{WL}{M_1}\right)^2}{k_2^2 + \left(\frac{WL}{M_2}\right)^2} \cdot \frac{M_1}{M_2}}$$

where $k_1$ and $k_2$ are respectively the radii of gyration about the center of gravity of each system. In this case, since $k_1$ is much greater than $WL/M_1$ and $k_2$ is much greater than $WL/M_2$ and $k_1$ is substantially equal to $k_2$, the following approximation is obtained:

$$\frac{T_1}{T_2} \cong \sqrt{\frac{M_1}{M_2}} \tag{5}$$

As apparent from equation (5), the smaller the total equivalent mass $m_t$ of a tone arm is, the quicker is the response. That is, the conformability is improved and the reproduction from the recording disc 3 improves. In view of the above, the mass of the shell 5 should be quite small.

With an acoustic device such as a record player or the like, it is well known that the greater the internal loss of vibrational energy is, the greater is the attenuation and the absorption of vibrational energy. Thus, if an external vibratory energy is delivered to the shell 5 which has a small internal loss, the vibration cannot be effectively removed, and the reproduction characteristic of the system is adversely affected.

As described above, in order to obtain an acoustically and physically superior pickup, the shell 5 must be light in weight and have a large internal loss. Accordingly, a shell formed by a material such as iron, aluminum or the like as in the prior art is not satisfactory for this purpose. Furthermore, in addition to the aforementioned construction, if the rigidity of the shell 5 is not relatively high, a resonance phenomenon or dip occurs at a frequency in the middle sound range of the frequency band being reproduced. Therefore, in order to remove these phenomenon, the rigidity must be increased.

In accordance with the present invention as shown in FIG. 4, a shell 20 is formed by a combination of a metal member 21 with a composite member 22 made of carbonaceous fibers having high rigidity and small specific gravity, bonded together with a synthetic resin such as a phenolic resin, an epoxy resin, or the like as a binding agent.

The composite member 22 is formed from starting material shown in FIG. 6, consisting of carbonaceous fibers 26 each being about 7 microns in diameter and about 40 millimeters in length which are held together with a thermosetting resin such as an epoxy resin to form a so-called pre-impregnated sheet. About 10 plies of these sheet-like members can be laminated and placed in a mold for thermal compression. If the directions of fiber lay are changed in the preimpregnated sheet to laminate the carbon fibers in different directions, the rigidity is even more increased. A metal member 21 of aluminum, or beryllium is then added.

This metal 21 and the composite member 22 are fixed by a suitable adhesive, or secured by a heat-press. In this case, the thermosetting resin such as an epoxy resin is used as adhesive.

The carbonfiber has a modulus of longitudinal elasticity of about 9,000 kilograms per square millimeter while aluminum alloy has a modulus of about 7,000 kilograms per square millimeter, so that the shell 20 produced according to this invention is greater in rigidity than the prior art shell. Further, the specific gravity of the shell is lighter than aluminum, so that the equivalent mass $M_t$ is decreased and the frequency limit $f_L$ expressed by equation (1) becomes higher. Thus, even though a cartridge of high compliance is used, the equivalent mass $M_t$ can be reduced more satisfactorily.

Since the equivalent mass of the pickup system is quite small, the pendulum period T expressed by equation (5) can become small, thereby improving the conformability of the tone arm so that a high compliance cartridge having good trackability can be obtained, together with high fidelity reproduction.

Furthermore, since the member 22 is covered with the metal member 21, an upper surface of the sheet is well shaped, and it is noted that the resonance frequency $f_1$ of the member 21 is different from the resonance frequency $(f_2)$ of the member 22, that is, the shell 20 does not resonate at a specific frequency. If a shell is formed by only carbon fibers, such shell may resonate at a specific frequency, because the shell is constructed with one material.

The composite member may be formed in a mold and has a substantially L-shaped cross-section consisting of a plate-like cartridge mounting portion 20a and an arm mounting portion 20b which is perpendicular to the former and is provided therethrough with a bore 25 for mounting the tone arm. The cartridge mounting portion 20a includes apertures 23 for mounting the cartridge. The arm mounting portion 20b is preferably made thicker than the cartridge mounting portion 20a so as to increase its strength. The cross-section of the shell is illustrated in FIG. 5.

FIG. 7 shows a second embodiment. In this case, a shell 30 is constructed with a carbon fiber member 31 and metal members 32 and 33, so that member 31 is sandwiched by members 32 and 33.

While certain embodiments of the invention have been illustrated and described in detail, it should be understood that the invention is not limited to these embodiments.

I claim as my invention:

1. A phonograph tone arm assembly comprising a tone arm, a cartridge shell and a phonograph pick-up cartridge, said cartridge shell including an L-shaped member formed of a large number of carbon fibers bonded together by a synthetic resin into an L-shape having a horizontal leg portion and a vertical leg portion, and a metal plate of L-shape firmly secured to the upper surface of said horizontal leg of said L-shape fiber member and to the outer end surface of said L-shape fiber member, said cartridge being secured to the under surface of the horizontal leg of said shell and said shell having its vertical leg secured to the end of said tone arm.

2. A cartridge shell according to claim 1, in which the synthetic resin is a phenolic resin.

3. A cartridge shell according to claim 1, in which the synthetic resin is an epoxy resin.

4. A cartridge shell according to claim 1, in which said carbon fibers are formed as a plurality of layers of fibers laminated together.

5. A cartridge shell according to claim 4, in which the said fibers are laminated in different directions.

6. A cartridge shell according to claim 1, in which said metal plate is aluminum.

7. A cartridge shell according to claim 1, in which said metal plate is beryllium.

* * * * *